April 15, 1924.  1,490,647
E. THOMSON
PROCESS OF MAKING ENDLESS METAL FORMS
Filed March 16, 1921.
Fig. 1
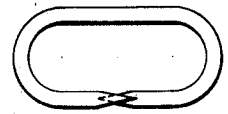
Fig. 2
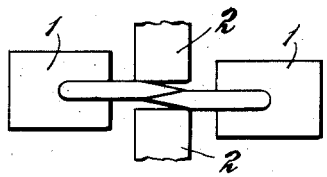
Fig. 3
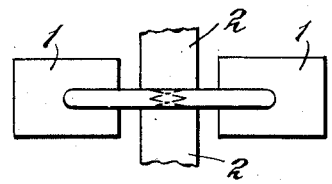
Fig. 4
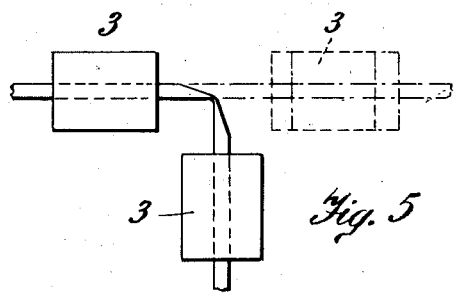
Fig. 5
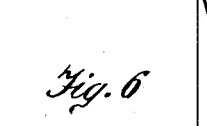
Fig. 6
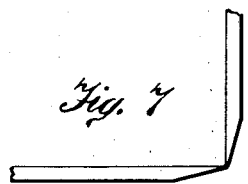
Fig. 7
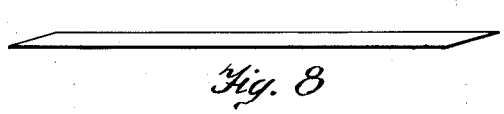
Fig. 8
Fig. 9
Fig. 10
Inventor
Elihu Thomson
By his Attorneys
Townsend & Decke Patented Apr. 15, 1924.

1,490,647

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

PROCESS OF MAKING ENDLESS METAL FORMS.

Application filed March 16, 1921. Serial No. 452,666.

*To all whom it may concern:*

Be it known that I, ELIHU THOMSON, a citizen of the United States, and a resident of Swampscott, in the county of Essex and State of Massachusetts, have invented certain new and useful Improvements in Processes of Making Endless Metal Forms, of which the following is a specification.

My invention relates to the process of making endless metal forms or objects such as chain links and more particularly to a process involving the use of certain operations wherein an electric current is passed through a section of metal to heat the same to a degree such that it may be separated by a pulling operation so as to produce a taper on the separated end which is utilized in a welding operation by overlapping the two tapered ends of the length so produced for a lap welding operation.

The invention further relates to a modification of the separating operation whereby the taper is given a flattened form approaching a flat face scarfing for the lap weld.

As my invention may be carried out by the use of apparatus well known in the art, said apparatus is not fully shown, the drawings being confined to parts of the same and to the illustration of the form which the metal takes at various stages of the operation.

In the drawings Fig. 1 shows one of the pieces or lengths produced by the pulling operation and Fig. 2 the same bent into the form of a chain link with the tapered ends overlapping for a lap weld.

Fig. 3 shows the lapped ends assembled in a welder for the lap welding operation.

Fig. 4 shows the weld completed.

Fig. 5 illustrates a modification in the separation process whereby the scarfing or tapering is flattened.

Figs. 6 and 7 illustrate the bending of the metal in the separation process first to one side and then the other respectively.

Fig. 8 illustrates the piece produced by such operation.

Fig. 9 shows the same piece bent with its tapered ends overlapping for welding and Fig. 10 shows the lapped part in cross-section.

To produce the pieces or lengths of the shape illustrated in Fig. 1, a bar or rod is placed in position between the heating clamps of a machine such as an electric welding machine, one or both of said clamps being adapted to be pulled away from one another to produce separation of the metal in the heated section between them according to a process heretofore employed and forming the subject of a prior patent issued to me, No. 396,014, Jan. 8, 1889.

As soon as the separation is produced the rod is moved up through the clamps such a distance that a repetition of the operation would produce a blank of the shape shown in Fig. 1, tapered at both ends. The blank so formed is then bent to cause the tapered ends to overlap as shown in Fig. 2, which illustrates the endless form of a chain link and the link is then placed in the heating clamps 1, 1 of any suitable heating or welding machine, as illustrated in Fig. 3, for a lap welding operation wherein the lapped parts are heated by the passage of the current from one to the other of the two clamps and the welding is effected by the use of pressure dies 2, 2.

In carrying out this operation it is preferable to mount one of the heating clamps so that it will be capable of moving up and down along with the upper pressure die 2 or the one to which the welding power is applied, so that after the welding operation the completed weld will be as illustrated in Fig. 4.

By this process of producing links or other endless forms with a lap weld it is seen that the taper or scarfing being done by electrical current, no particular expense or skill or tools is involved, the operation being in substance an electrical scarfing of the ends of the bar and with no attendant loss of metal. Instead of separating the bar or rod into pieces when the current is on for heating it by pulling it in a straight line, it may be partly pulled and partly bent so that the scarfing or tapering will be one-sided and more nearly resemble a real scarf so that a flattened surface is presented for lapping. This operation is illustrated in Fig. 3 wherein the two heating clamps are indicated at 3, 3 and the motion given to one of them, in addition to the pulling operation, is indicated by the arrow.

In producing the blanks or lengths, however, for the lap welding operation, the bending motion of the clamp sidewise should be reversed alternately, that is, for producing the scarf at one end of the piece the bending should be made in one direction and then, when the bar is moved along for producing the scarf at the opposite end of the piece, the bending should be in the opposite direction. This alternate operation is indicated in Figs. 6 and 7 respectively.

Fig. 8 shows the result in the separated piece or length of bar employed for the link or other endless form; said piece being bent to bring its ends into overlapped position, the ring or endless form as illustrated in Fig. 9 is suitably prepared for the lap welding operation, as already described.

The flattening of the tapered section is illustrated in the cross-section Fig. 10. It is obvious that while a true flat surface scarf is not produced the effect will be substantially the same as a true chamfering advantageous for the electrical welding by a lap weld.

In the scarfing process above described the current is left on until near the actual separation of the pieces which are not heated to anything near the welding heat but only to a point to allow them to be stretched easily.

What I claim as my invention is:—

1. The herein described process of making endless metal forms such as chain links, consisting in separating a metal rod or bar into successive lengths having a taper at each end by electrically heating and pulling said rod to produce a separation, moving up the rod in the heating clamps and repeating the operation, thereby producing blanks having a taper at both ends, bending the separated blanks or lengths and overlapping the tapered ends and then welding the same by an electric lap welding operation.

2. The herein described process of making endless metal forms such as chain links, consisting in separating a metal rod or bar into lengths having a taper at each end by electrically heating, pulling and bending said rod to produce a separate length having a flattened taper at its ends, overlapping the tapered ends and then electrically welding them together by the application of heating current and a die.

3. The herein described method of producing endless metal forms such as chain links, consisting in separating a metal rod or bar into lengths having a taper at each end by electrically heating the metal at the point of separation, pulling and bending successively in opposite directions to produce a flattened chamfer or scarf in opposite directions overlapping the scarfed ends and welding the same together.

4. The herein described method of producing endless metal forms such as chain links, consisting in separating a metal rod or bar into lengths having a taper at each end by electrically heating the metal at the point of separation, pulling and bending successively in opposite directions to produce a flattened chamfer or scarf in opposite directions overlapping the scarfed ends, passing a heating electric current through the lapped ends and lap welding them together by the application of a transverely operating die.

5. The herein described method of producing endless metal forms such as chain links, consisting in separating a metal rod or bar into lengths having a taper at each end by electrically heating the metal at the point of separation, pulling and bending successively in opposite directions to produce a flattened chamfer or scarf in opposite directions overlapping the scarfed ends, heating the lap by passing an electric heating current through the same from one to the other of two heating clamps and applying welding pressure transversely to the line joining said clamps.

Signed at Lynn in the county of Essex and State of Massachusetts this 20th day of January A. D. 1921.

ELIHU THOMSON.

Witness:
IRENE LEFKOWITZ.